United States Patent [19]

Hergenrother

[11] Patent Number: 4,565,886

[45] Date of Patent: Jan. 21, 1986

[54] ETHYNYL AND SUBSTITUTED ETHYNYL-TERMINATED POLYSULFONES

[75] Inventor: Paul M. Hergenrother, Yorktown, Va.

[73] Assignee: The United States of America as represented by the Administrator of the National Aeronautics and Space Administration, Washington, D.C.

[21] Appl. No.: 527,914

[22] Filed: Aug. 30, 1983

Related U.S. Application Data

[62] Division of Ser. No. 433,598, Oct. 8, 1982, Pat. No. 4,431,761.

[51] Int. Cl.$^4$ .......................... C07F 7/08; C07F 7/18; C07C 13/00; C07C 15/00
[52] U.S. Cl. ..................................... 556/436; 585/24; 260/544 D
[58] Field of Search .......................... 556/436; 585/24; 260/544 D

[56] References Cited

U.S. PATENT DOCUMENTS

| | | | |
|---|---|---|---|
| 3,558,683 | 1/1971 | Bolsky et al. | 556/436 X |
| 4,004,025 | 1/1977 | Fishman | 424/308 |
| 4,180,515 | 12/1979 | Bargain et al. | 556/436 X |
| 4,208,342 | 6/1980 | Bargain et al. | 556/436 |

Primary Examiner—Paul F. Shaver
Attorney, Agent, or Firm—Howard J. Osborn; John R. Manning; Wallace J. Nelson

[57] ABSTRACT

Ethynyl and substituted ethynyl-terminated polysulfones and a process for preparing the same are disclosed. These polysulfones are thermally cured to induce cross-linking and chain extension, producing a polymer system with improved solvent resistance and use temperatures. Also disclosed are substituted 4-ethynylbenzoyl chlorides as precursors to the substituted ethynyl-terminated polysulfones and a process for preparing the same.

2 Claims, No Drawings

ETHYNYL AND SUBSTITUTED ETHYNYL-TERMINATED POLYSULFONES

ORIGIN OF THE INVENTION

The invention described herein was made by an employee of the United States Government and may be manufactured and used by or for the Government for governmental purposes without the payment of any royalties thereon or therefor.

This is a division of application Ser. No. 433,598, filed Oct. 8, 1982, and now U.S. Pat. No. 4,431,761.

FIELD OF THE INVENTION

The present invention relates to a new class of sulfone polymers and oligomers. More prticularly, it relates to a group of ethynyl and substituted ethynyl-terminated sulfone polymers and oligomers which cross-link and chain extend upon heating, and then exhibit excellent solvent resistance and thermal stability.

BACKGROUND OF THE INVENTION

Polysulfones are commercially available thermoplastics which are widely used in a variety of applications such as adhesives, composites, or moldings for use in automobiles, household appliances and other applications. As thermoplastics, they are generally amorphous and creep under load at elevated temperatures. A more important use limitation is their sensitivity to various solvents, especially when the polymer is in a stressed condition. Because of this solvent sensitivity, conventional polysulfones cannot be used in many applications such as adhesives or composite matrices for use on commercial airplanes, which may be exposed to numerous solvents such as hydraulic and deicing fluids, fuel, and paint strippers. Composites from polysulfones, especially under load, exhibit pronounced crazing and cracking upon exposure to solvents, with loss of mechanical properties.

Various routes have been employed in an attempt to overcome the two major use limitations of polysulfones, creep at elevated temperature and solvent sensitivity. Each such attempt has not been entirely successful because either new difficulties were introduced or the original problem was not entirely solved. In one such application, polysulfones containing crystalline regions which serve as cross-links were employed to increase solvent resistance. The problem with using crystallinity to attain solvent resistance is that the material is more difficult to process and the physical properties of the polymer depend upon the amount or degree of crystallinity which is introduced into the polymer. The degree to which the polymer crystallizes is difficult to control and maintain, and when the degree of crystallinity changes, the physical properties change accordingly. This makes polymers of this type undesirable in certain applications, as in the design of airplane components which must be capable of performing for more than 50,000 hours in hostile environments.

An ethynyl-terminated sulfone monomer has been previously prepared and thermally polymerized to yield a brittle resin (elongation of approximately 6%) (see M. G. Maximovich, S. C. Lockerby, F. E. Arnold, and G. A. Loughran, *Science of Advanced Material and Process Engineering Serries*, vol. 23, p. 490 (1978)). The present invention differs from this in that higher molecular weight materials are used to retain toughness and the chemistry involved is entirely different (i.e., the synthesis is easier and less expensive). Propargyl terminated sulfone monomers and resins therefrom have also been disclosed. See U.S. Pat. No. 4,226,800 to Picklesimer. Once again, the chemistry involved is entirely different; propargyl (HC≡C-CH$_2$-) groups are used to introduce cross-linking versus the ethynyl and substituted ethynyl groups (-C≡C-X), employed in the present invention. The polymers in Picklesimer are therrmosets, whereas the polymers of the present invention, depending on the molecular weight of the precursor polysulfone, are thermoplastics. Thermostats are generally high strength, brittle materials with low impact strength. Thermoplastics are relatively high strength, tough materials with high impact strength. Furthermore, thermosets cannot be reformed once they have cured whereas thermoplastics can be reformed as necessary. This feature makes thermoplastics commercially more attractive because scraps and faulted moldings can be reprocessed, thus reducing waste. There is thus a definite need in the art for a thermoplastic polysulfone exhibiting improved resistance to solvents and creep at elevated temperatures.

Accordingly, it is an object of this invention to provide a new thermoplastic composition produced from polysulfones and containing various degrees of cross-linking.

Another object of the present invention is to provide a new thermoplastic composition that will chain extend upon curing.

It is yet another object of the present invention to provide novel thermoplastic polysulfones which exhibit improved use temperatures and solvent resistance.

It is a further object of the present invention to provide a high yield process for preparing thermoplastic polysulfones which exhibit improved use temperatures and solvent resistance.

SUMMARY OF THE INVENTION

According to the present invention, the foregoing and additional objects are attained by producing a class of polysulfones containing ethynyl and substituted ethynyl groups, which upon application of heat will cross-link and chain extend to produce highly solvent resistant and thermally stable polymer systems. The polymers are synthesized from the reaction of an hydroxy-terminated polysulfone with bromobenzoyl chloride to yield an intermediate which is then reacted with a substituted ethynyl compound to yield the product as shown in the following representative scheme:

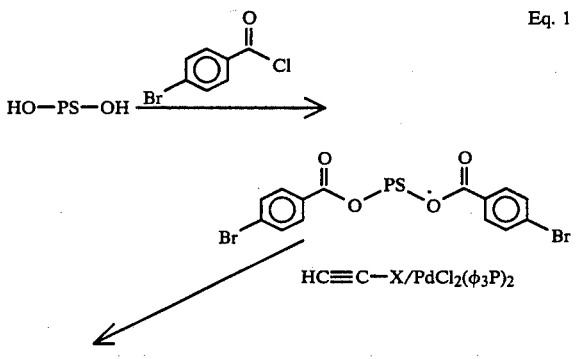

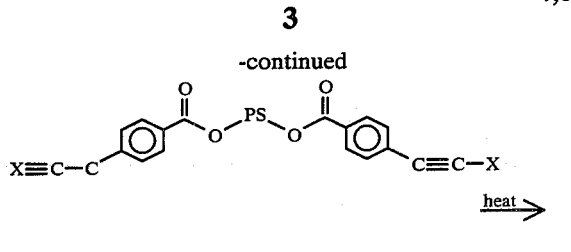

solvent resistant cross-linked polysulfone where PS is a polysulfone with a molecular weight between 1000 and 50,000 and X is selected from the group consisting of:

Si(CH$_3$)$_3$; straight or branched organic radicals having 4 to 10 carbon atoms; substituted aromatic groups of the formula:

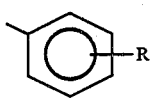

where R is selected from the group consisting of: straight or branched organic radicals having 1 to 12 carbon atoms, H, and

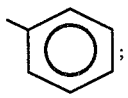

and halogenated derivatives of all of the above.

As an alternative route, an ethynyl-substituted benzoyl chloride may be reacted directly with a hydroxy-terminated polysulfone to yield the product as represented in the following scheme:

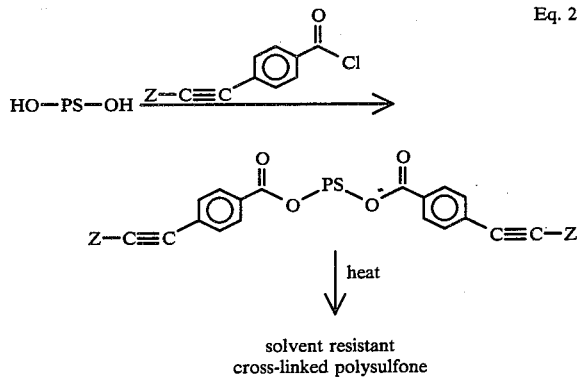

solvent resistant
cross-linked polysulfone where PS is as defined above, and Z is selected from the group consisting of: X (as defined above) and H.

The molecular weight of the starting polysulfone may be varied according to the physical properties desired in the final polymer system. A low molecular weight starting material (depending upon the particular polysulfone selected, a molecular weight of approximately 3000 g/mole) will result in a more highly cross-linked product which is highly solvent resistant, but is also less thermoformable. A high molecular weight starting material (again depending upon the particular polysulfone, approximately 26,000 g/mole) will result in a product which has good thermoformability and improved solvent resistance, but will be susceptible to attack by certain solvents. A tabulation of the physical properties of the product resulting from various molecular weight starting polysulfones (PS), and a comparison with a commercially available polysulfone from Union Carbide Corporation, UDEL ® is shown in Table I. As shown therein, at comparable glass transition temperatures (Tg), the cross-linked polysulfones of the present invention show a marked improvement in solvent resistance over the commercially available polysulfone. The marked difference in Tg and solubility between the bromo-substituted and the ethynyl-substituted polymers highlights the dramatic improvement in the physical properties of a given PS when the cross-linking ethynyl groups are added.

TABLE I

| $\overline{M}_n$ of Starting PS | Substituent (Y)[1] | Tg of Cured Resin, °C. DSC[2] | Tg of Cured Resin, °C. TBA[3] | Chloroform Solubility of Cured Resin |
|---|---|---|---|---|
| 3000 | Br— | 161 | 163 | sol. |
|  | (CH$_3$)SiC≡C— | 207 | 207 | insol. |
|  | HC≡C— | 209 | 207 | insol. |
| 3000 | HC≡C—(DR)[4] | 211 | 208 | insol. |
| 5000 | Br— | 177 | 178 | sol. |
|  | (CH$_3$)$_3$SiC≡C— | 204 | 205 | sl. swelling |
|  | HC≡C— | 203 | 203 | sl. swelling |
| 9000 | Br— | 183 | 182 | sol. |
|  | (CH$_3$)$_3$SiC≡C— | 201 | 203 | sl. swelling |
|  | HC≡C— | 202 | 203 | sl. swelling |
| 12000 | Br— | 180 | 181 | sol. |
|  | (CH$_3$)$_3$SiC≡C— | 197 | 192 | swells |
|  | HC≡C— | 198 | 195 | swells |
| 12000 | HC≡C—(DR)[4] | 201 | 198 | swells |
| 15000 | Br— | 187 | 187 | sol. |
|  | (CH$_3$)$_3$SiC≡C— | 196 | 194 | swells |
|  | HC≡C— | 197 | 198 | swells |
| 26000 | Br— | 192 | 189 | sol. |
|  | (CH$_3$)$_3$SiC≡C— | 193 | 188 | pron. swelling |
|  | HC≡C— | 195 | 192 | pron. swelling |
| 25000 (UDEL) ® | — | 193 | 194 | sol. |

[1] (structure shown)
[2] Differential scanning calorimetry at heating rate of 20° C./min.
[3] Torsional braid analysis at heating rate of 3° C./min.
[4] Direct route using 4-ethynylbenzoyl chloride, see Eq. (2).

The cross-linked polysulfones of the present invention also exhibit superior mechanical stability at elevated temperatures. As shown in Table II, the ethynyl-terminated polysulfone loses only 2.5% of the flexural strength as the temperature is increased from ambient to 93° C.; this is a 60% improvement over the loss of strength in UDEL ®, and a similar improvement is realized in the flexural modulus. While the improvement in shear strength is not as dramatic, it remains significant. The polymer of the present invention exhibits an 8.5% improvement over UDEL ® in loss of shear strength as the temperature rises from ambient to 93° C.

TABLE II

| | Preliminary Unidirectional Carbon/Graphite Filament Laminate Data[1] | | | | | |
|---|---|---|---|---|---|---|
| Test | Flexural St. psi × 10³ | | Flexural Mod. psi × 10⁶ | | Short Beam Shear St., psi × 10³ | |
| Conditions | UDEL ® | ETRS[2] | UDEL ® | ETPS[2] | UDEL ® | ETPS[2] |
| Room Temperature | 189 | 197 | 18.6 | 19.4 | 8.5 | 9.3 |
| 93° C., 10 min. | 177 | 192 | 17.1 | 18.9 | 8.1 | 8.9 |
| 177° C., 10 min.[3] | 121 | 153 | 13.4 | 15.5 | 4.1 | 5.3 |

Having generally described the invention, a more complete understanding thereof can be obtained by reference to the following specific examples which are provided herein for purposes of illustration only and are not to be limiting on the invention.

EXAMPLE I

Trimethylsilylethynylbenzoate-Terminated Polysulfones

The hydroxy-terminated PS of various molecular weights were converted to trimethylsilylethynylbenzoate-terminated PS as shown in Eq. (1) by the following representative procedure. Hydroxy-terminated PS [30 g, $\overline{M}n$ = 12,000, Tg = 183° C.] was dissolved in a mixture of chloroform (250 ml) and triethylamine (20 ml). A solution of excess 4-bromobenzoyl chloride (11 g) in chloroform (50 ml) was added dropwise over a period of 20 minutes at ambient temperature to the stirred PS solution. After stirring for three hours, the solution was poured into methanol in a blender to precipitate 4-bromobenzoate-terminated PS as a white solid. The resultant precipitate was boiled in methanol, filtered, and dried at 90° C. to yield a white solid (30 g) (IR, no detectable absorptions characteristics of hydroxy groups, absorption at 1740 cm$^{-1}$ attributed to the ester carbonyl).

The 4-bromobenzoate-terminated PS (25 g) was dissolved in dry N,N-dimethylacetamide (300 ml, DMAC). Triethylamine (50 ml), dichlorobis(triphenylphosphine)palladium (0.6 g), and trimethylsilylacetylene (6.4 g) were added to the PS solution under a nitrogen atmosphere. A drying tube replaced the nitrogen flush, and the yellow solution was stirred at 60°-80° C. for four hours. The resultant brown solution was poured into cold dilute aqueous hydrochloric acid (10°-20° C.) in a blender to precipitate a light tan solid. After thoroughly washing successively with dilute aqueous hydrochloric acid, three times with water, and twice with hot methanol, trimethylsilylethynylbenzoate-terminated PS was isolated as a light tan solid (24.0 g), (IR, essentially identical to that of the 4-bromobenzoate-terminated PS except for a very weak band at 2160 cm$^{-1}$ due to C≡C and an increase in the intensity of the 840 cm$^{-1}$ band, attributed to Si-CH$_3$ symmetry deformation).

EXAMPLE II

Ethynylbenzoate-Terminated Polysulfones

Trimethylsilylethynyl benzoate-terminated PS (12.0 g from the preceding procedure) was dissolved in DMAC (100 ml) and powdered potassium carbonate (1.5 g) was added. The light brown reaction mixture was vigorously stirred at 40° C. for two hours and subsequently poured into dilute aqueous hydrochloric acid in a blender. The light tan precipitate was thoroughly washed successively with water and twice with hot methanol to yield 4-ethynylbenzoate-terminated PS as a light tan solid (11.7 g) (IR esentially identical to that of the 4-bromobenzoate-terminated PS except for a weak sharp band at 3300 cm$^{-1}$ attributed to H—C≡C stretch).

EXAMPLE III

An alternate and more direct approach to the preparation of the ethynylbenzoate-terminated PS involved the reaction of the hydroxy-terminated PS with 4-ethynylbenzoyl chloride as in Eq. 2. The 4-ethynylbenzoyl chloride was prepared as follows: 4-Bromobenzoic acid (11.0 g, 0.055 mole; source, Aldrich Chemical Company), dichlorobis(triphenylphosphine)palladium (0.3 g; source, Strem Chemical, Inc.), pyridine (60 ml), triethylamine (40 ml), and trimethylsilylacetylene (8.3 g, 0.085 mole; source, Silar Laboratories Inc.) were stirred under nitrogen at 70°-74° C. for six hours. The yellow solution turned brown and a precipitate appeared (presumably triethylammonium bromide). The reaction mixture was poured into cold dilute aqueous hydrochloric acid (10° C.-20° C.) to yield 4-trimethylsilylethynylbenzoic acid as a crude tan solid (11.0 g), m.p. 175°-185° C. decomp. [lit. m.p. 181°-182.5° C.)]. The tan solid was dissolved in dilute aqueous sodium hydroxide solution, filtered, and the filtrate acidified to yield a light tan solid (9.6 g). Recrystallization twice from toluene provided 4-ethynylbenzoic acid as golden needles (4.3 g), m.p. 222°-223° C. decomp. (Sample introduced in a preheated melting point apparatus at 220° C.)[lit m.p. 218° C. decomp.] [IR, strong sharp absorption at 3300 cm$^{-1}$ characteristic of H—C≡C stretch. Mass spectroscopy (MS), molecular ion (M+) at 146 [4-ethynylbenzoic acid (mol. wt. 146)], major fragments m/e 129 (HC≡C—C$_6$H$_4$—CO+) and 101 (HC≡C—C$_6$H$_4$+)]. 4-Ethynylbenzoic acid (4.2 g) was stirred in thionyl chloride (30 ml) containing a few drops of N,N-dimethylformamide at ambient temperature overnight (8-20 hours). The light orange solution was concentrated to dryness at temperature <40° C. in vacuo to yield an orange crystalline solid which was thoroughly washed with cold n-hexane (5° C.-10° C.). The resultant yellow crystalline solid (3.1 g) was dissolved in warm n-hexane (30 ml) and the solution cooled to 5° C. to 10° C. Since no solid appeared, the solution was partially concentrated to yield 4-ethynylbenzoyl chloride as crude yellow needles (3.0 g), m.p. 32°–34° C., (IR, H—C≡C at 3300 cm$^{-1}$, C=O doublet at 1800 and 1770 cm$^{-1}$). Sublimination in nitrogen atmosphere under vacuum provided white crystalline needles, m.p. 69°–70° C.

To prepare the ethynylbenzoate-terminated PS, the 4-ethynylbenzoyl chloride (0.5 g) was then reacted with the hydroxy-terminated PS (1.7 g, $\overline{M}n$=12000, Tg=183° C.) in chloroform (20 ml) and triethylamine (0.5 ml). The light orange solution was stirred at ambient temperature for three hours and at 40° C. for one hour followed by quenching in methanol (300 ml) in a blender. The resultant off-white solid was boiled in methanol and dried at 90° C. to yield the ethynylbenzoate-terminated PS (1.7 g) [IR, essentially identical to the 4-bromobenzoate-terminated PS except for a weak sharp band at 3300 cm$^{-1}$ (H—C≡C)].

The yields of these syntheses were greater than 90%, a significant increase over yields of other cross-linked polymers reported in prior art.

Once the substituted ethynyl-terminated polysulfone has been prepared, it can, for example, be dissolved in a suitable solvent, such as cyclohexanone, DMAC, or chloroform, and cast into films, or used to impregnate reinforcing material and subsequently used to form a composite. The film or composite can then be heated to induce the reaction of the end groups to cause cross-linking and chain-lengthening. The resulting polymeric system will then exhibit solvent resistance and a higher use temperature.

Alternatively, powder samples of the substituted ethynyl-terminated polysulfone can be molded in suitable molds introduced into a press preheated to approximately 316° C. and pressure applied for 15 minutes. The degree of flow exhibited by the polymer will depend upon the molecular weight of the starting polysulfone, i.e, normally the higher the molecular weight, the better the flow characteristics. The press temperature is more than sufficient to induce the ethynyl groups to react, thus the molded product need not be further cured to exhibit the superior solvent and thermal qualities.

The above specific examples are considered illustrative of the invention and there may be variations in the substituted acetylene or substituted ethynylbenzoyl chloride that will be apparent to those skilled in the art without departing from the spirit and scope of the invention as set forth herein.

It is recognized, for instance, that where chloroform has been used in the examples, other chlorinated organic solvents such as methylene chloride, symmetric tetrachloroethane and possibly others, could also be used. Likewise, where triethylamine has been used in the examples, other organic bases such as diethylamine, tripropylamine and possibly others could be used as well. Similarly, where methanol has been employed as a precipitating agent, it is recognized that other non-solvents such as ethanol, propanol, and possibly other liquids in which the precipitate would not be soluble could also be employed. Also, other highly polar solvents which could be substituted for N,N-dimethylacetamide include hexamethylphosphoramide, N,N-dimethylformamide, and possibly others.

What is claimed as new and desired to be secured by Letters Patent of the United States is:

1. A process for preparing the substituted 4-ethynylbenzoyl chloride of the formula

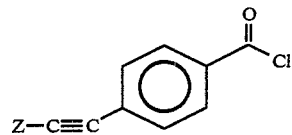

where Z is selected from the group consisting of Si(CH$_3$)$_3$; H; straight or branched alkyl groups having from 1 to 10 carbon atoms; substituted aromatic groups of the formula

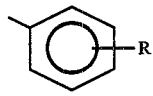

where R is selected from the group including straight or branched alkyl groups having from 1 to 12 carbon atoms, H, and

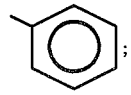

and halogenated derivatives of all of the above, comprising the steps of:
  stirring, a catalytic amount of dichlorobis(triphenbylphosphine)palladium, and at least a stoichiometric amount of a substituted acetylene in an organic base under an inert atmosphere at 70°–74° C. for five to seven hours,
  precipitating the substituted 4-ethynylbenzoic acid with cold dilute aqueous acid (10°–20° C.), and purifying the precipitate by recrystallization from toluene,
  stirring the precipitate in thionyl chloride with a small amount of N,N-dimethylformamide added at ambient temperature for 8–20 hours, and
  concentrating the solution to dryness at temperatures <40° C. in vacuo to yield the substituted 4-ethynylbenzoyl chloride which may be purified by recrystallization from n-hexane or by sublimation.

2. The process of claim 1 wherein the substituted acetylene is of the formula HC≡C—X;
  where X is selected from the group consisting of: Si(CH$_3$)$_3$; straight or branched alkyl groups having 4 to 10 carbon atoms; substituted aromatic groups of the formula:

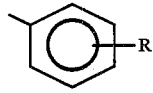

where R is selected from the group including: straight or branched alkyl groups having from 1 to 12 carbon atoms, H, and

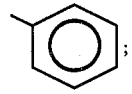

and halogenated derivatives of all the above.

* * * * *